(12) United States Patent
Zhang et al.

(10) Patent No.: US 8,462,741 B2
(45) Date of Patent: Jun. 11, 2013

(54) UPLINK POWER CONTROL FOR MULTIPLE TRANSMIT ANTENNAS

(75) Inventors: Xiaoxia Zhang, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 334 days.

(21) Appl. No.: 12/848,959

(22) Filed: Aug. 2, 2010

(65) Prior Publication Data

US 2011/0044296 A1 Feb. 24, 2011

Related U.S. Application Data

(60) Provisional application No. 61/231,293, filed on Aug. 4, 2009.

(51) Int. Cl.
*H04J 3/00* (2006.01)

(52) U.S. Cl.
USPC .......................................................... 370/336

(58) Field of Classification Search
USPC .................. 370/336, 335, 318, 342, 320, 332, 370/333, 331, 330, 328; 375/365, 347
See application file for complete search history.

(56) References Cited

U.S. PATENT DOCUMENTS

| | | | |
|---|---|---|---|
| 7,336,751 B2 * | 2/2008 | Harada et al. | 375/365 |
| 7,792,207 B2 * | 9/2010 | Harel et al. | 375/267 |
| 7,817,972 B2 * | 10/2010 | Wan et al. | 455/115.1 |
| 2002/0126640 A1 | 9/2002 | Komatsu | |

FOREIGN PATENT DOCUMENTS

| WO | WO03032502 A2 | 4/2003 |
|---|---|---|
| WO | WO2006069321 | 6/2006 |

OTHER PUBLICATIONS

International Search Report and Written Opinion—PCT/US2010/044460, International Search Authority—European Patent Office—Feb. 17, 2011.

* cited by examiner

*Primary Examiner* — Chi Pham
*Assistant Examiner* — Alexander O Boakye
(74) *Attorney, Agent, or Firm* — Kenyon S. Jenckes

(57) ABSTRACT

Techniques for controlling the transmit power of a user equipment (UE) using multiple antennas for uplink transmission are described. In one design, the UE receives at least one transmit power control (TPC) command for the multiple antennas. The UE adjusts the transmit power for each antenna based on the TPC command(s). In one design, the UE receives a single TPC command for all antennas and adjusts the transmit power for each antenna based on this TPC command. All antennas may then have equal transmit power. In another design, the UE receives multiple TPC commands for multiple antenna groups, one TPC command for each antenna group. Each antenna group may include one antenna or more than one antenna. The UE adjusts the transmit power for each antenna group based on the TPC command for that antenna group. All antennas in each antenna group may have equal transmit power.

37 Claims, 6 Drawing Sheets

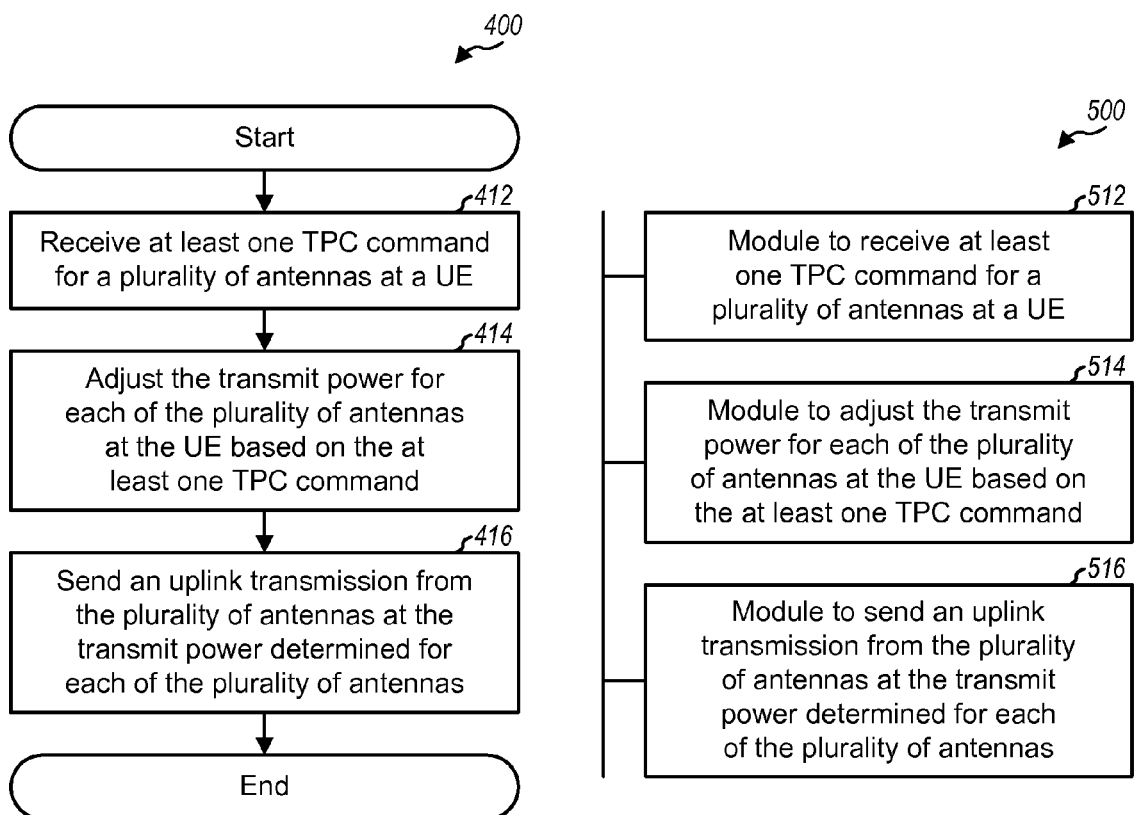

UPLINK POWER CONTROL FOR MULTIPLE TRANSMIT ANTENNAS

The present application claims priority to provisional U.S. Application Ser. No. 61/231,293, entitled "UPLINK POWER CONTROL FOR MULTIPLE TRANSMIT ANTENNAS," filed Aug. 4, 2009, assigned to the assignee hereof and incorporated herein by reference.

BACKGROUND

I. Field

The present disclosure relates generally to communication, and more specifically to techniques for performing power control in a wireless communication network.

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

Multiple UEs may simultaneously transmit data on the uplink to a base station. This may be achieved by multiplexing the transmissions to be orthogonal to one another in time, frequency and/or code domain. Complete orthogonality, if achieved, results in the transmission from each UE not interfering with the transmissions from other UEs at the base station. However, complete orthogonality among the transmissions from different UEs is often not realized due to channel conditions, receiver imperfections, etc. The loss of orthogonality results in each UE causing some amount of interference to the other UEs communicating with the same base station. Furthermore, the transmissions from UEs communicating with different base stations are typically not orthogonal to one another. Thus, each UE may also cause interference to other UEs communicating with other base stations. The performance of each UE may be degraded by the interference from other UEs in the wireless network.

SUMMARY

Techniques for controlling the transmit power of a UE are described herein. The UE may send a transmission using a plurality of antennas in order to increase data rate and/or improve reliability. Power control may be performed to adjust the transmit power for the plurality of antennas at the UE.

In one design, the UE may receive at least one transmit power control (TPC) command for the plurality of antennas at the UE. The UE may adjust the transmit power for each of the plurality of antennas based on the at least one TPC command. In one design, the UE may receive a single TPC command for all antennas and may adjust the transmit power for each antenna based on this single TPC command. The plurality of antennas may then have equal transmit power. In another design, the UE may receive a plurality of TPC commands for a plurality of antenna groups, one TPC command for each antenna group. Each antenna group may include a different subset of the plurality of antennas. In one design, each antenna group may include a single antenna. In another design, an antenna group may include more than one antenna. For both designs, the UE may adjust the transmit power for each antenna group based on the TPC command for that antenna group. All antennas in each antenna group may have equal transmit power. The UE may send an uplink transmission from the plurality of antennas at the transmit power determined for each antenna.

In another design, a base station may generate the at least one TPC command for the plurality of antennas at the UE. In one design, the base station may generate a single TPC command for all antennas at the UE. In another design, the base station may generate a TPC command for each antenna group at the UE. In any case, the base station may send the at least one TPC command to the UE for use to adjust the transmit power for each antenna at the UE. The base station may thereafter receive an uplink transmission sent by the UE from the plurality of antennas at the transmit power determined for each antenna.

Various aspects and features of the disclosure are described in further detail below.

BRIEF DESCRIPTION OF THE DRAWINGS

FIG. 4 shows a process for performing uplink power control by a UE.

FIG. 5 shows an apparatus for performing uplink power control.

DETAILED DESCRIPTION

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
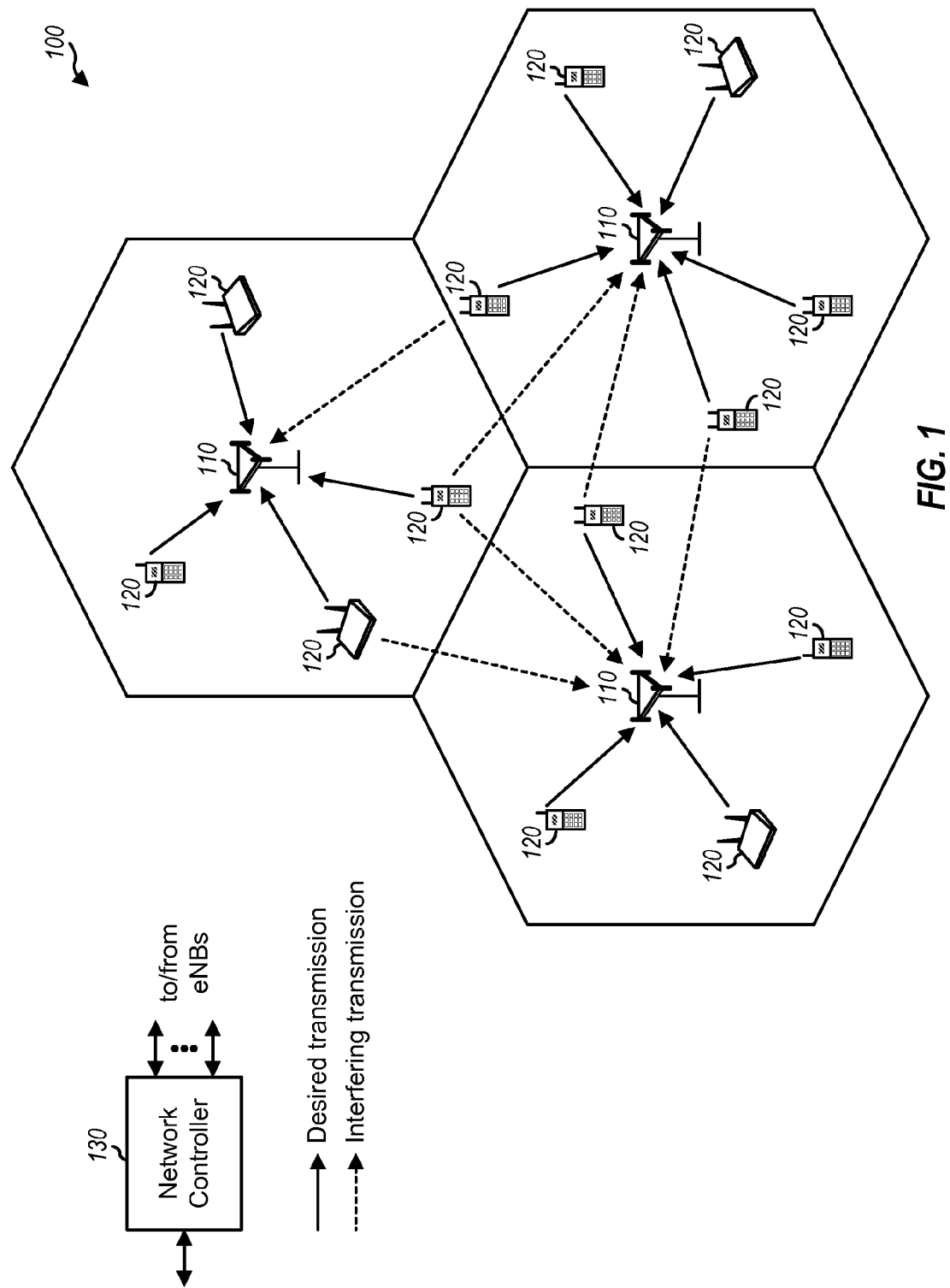
FIG. 1 shows a wireless communication network.

FIG. 1 shows a wireless communication network 100, which may be an LTE network or some other wireless network. Wireless network 100 may include a number of evolved Node Bs (eNBs) 110 and other network entities. An eNB may be an entity that communicates with the UEs and may also be referred to as a base station, a Node B, an access point, etc. Each eNB 110 may provide communication coverage for a particular geographic area and may support communication for the UEs located within the coverage area. To improve network capacity, the overall coverage area of an eNB may be partitioned into multiple (e.g., three) smaller areas. Each smaller area may be served by a respective eNB subsystem. In 3GPP, the term "cell" can refer to the smallest coverage area of an eNB and/or an eNB subsystem serving this coverage area.

A network controller 130 may couple to a set of eNBs and may provide coordination and control for these eNBs. Network controller 130 may be a single network entity or a collection of network entities. Network controller 130 may communicate with the base stations via a backhaul. The eNBs may also communicate with each other via a backhaul, e.g., an X2 interface in LTE.

UEs 120 may be dispersed throughout the wireless network, and each UE may be stationary or mobile. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a smart phone, a netbook, a smartbook, etc. A UE may communicate with a serving eNB on the downlink and/or uplink. Only uplink transmissions are shown in FIG. 1. On the uplink, each eNB may observe interference from UEs communicating with neighbor eNBs. The interference may degrade performance.

Wireless network 100 may support power control for the UEs on the uplink. For power control on the uplink (or uplink power control), an eNB may control the transmit power of a UE to obtain good performance while reducing interference to other UEs at their serving eNBs.

Figure 2:
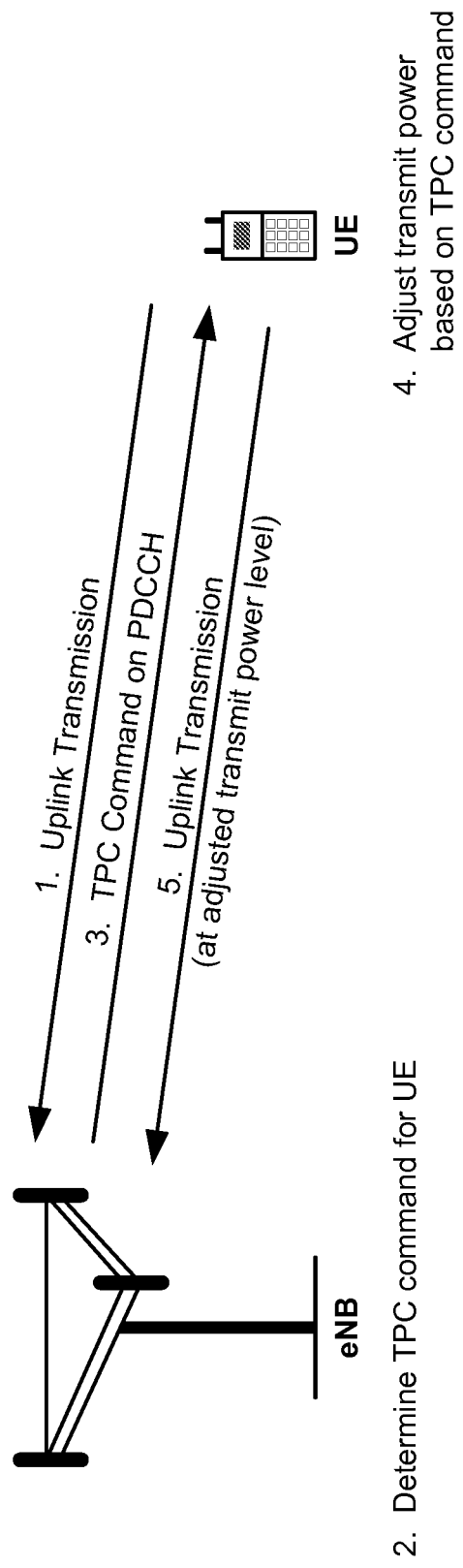
FIG. 2 shows a design of a process for power control on the uplink.

FIG. 2 shows a design of power control on the uplink. A UE may send an uplink transmission to a serving eNB (step 1). The uplink transmission may comprise data, or control information, or a reference signal, or a combination thereof. The eNB may determine a metric for the uplink transmission from the UE. The metric may relate to received signal quality, received power, interference, etc. Received signal quality may be quantified by a signal-to-noise-and-interference ratio (SINR), a carrier-to-interference ratio (C/I), etc. Interference may be quantified by an interference-over-thermal (IoT), etc. The eNB may compare the computed metric against one or more thresholds and may generate a transmit power control (TPC) command based on the result of the comparison (step 2). The TPC command may direct the UE to increase, decrease, or maintain its transmit power level. The eNB may send the TPC command on a Physical Downlink Control Channel (PDCCH) to the UE (step 3). The UE may receive the TPC command and may adjust its transmit power level accordingly based on the TPC command (step 4). The UE may thereafter send an uplink transmission on a Physical Uplink Shared Channel (PUSCH) or a Physical Uplink Control Channel (PUCCH) at the adjusted transmit power level to the eNB (step 5).

The UE may use a single antenna for transmission at any given moment. In general, an antenna may be (i) a physical antenna formed with one or more physical antenna elements at the UE or (ii) a virtual antenna formed with multiple physical antennas. An antenna may also be referred to as an antenna port, etc. If the UE has a single active antenna, then a TPC command may be used to adjust the transmit power for this single antenna.

In an aspect, power control may be performed for a UE using multiple (T) antennas for transmission to increase data rate and/or improve reliability. Power control on the uplink for the multiple antennas at the UE may be performed in various manners.

In a first uplink power control design, which may be referred to as common uplink power control, a single TPC command may be used to control the transmit power for all T antennas at the UE. The same amount of transmit power may be used for each antenna at the UE. The transmit power for all T antennas may be increased or decreased by the same amount or maintained at the same power level based on the single TPC command. This design may result in lower overhead on the PDCCH to support power control for the multiple antennas. This design may also be compatible with uplink power control for a UE using a single antenna. In particular, a single TPC command may be sent on the PDCCH using downlink control information (DCI) format 0, 1, 1A, 1B, 1D, 2, 2A or 2B defined in LTE. For each of these DCI formats, a control message for a UE may be sent on the PDCCH and may include a single TPC command as well as other parameters for transmission on the uplink. This single TPC command may be applicable regardless of whether the UE uses multiple antennas or a single antenna.

In a second uplink power control design, which may be referred to as per-antenna group uplink power control, a TPC command may be used to control the transmit power for each antenna group at the UE. The T antennas at the UE may be arranged into multiple (G) groups. In general, each group may include one or more antennas, and the G groups may include the same or different numbers of antennas. In one design, each group may include a single antenna, and the number of antenna groups may be equal to the number of antennas, or G=T. In this design, T different TPC commands may be sent for the T antennas, one TPC command for each antenna. In another design, a group may include more than one antenna, and the number of antenna groups may be less than the number of antennas, or G<T. In this design, G different TPC commands may be sent for the T antennas, one TPC command for each antenna group.

For the second uplink power control design, power control may be performed separately for each antenna group. The transmit power for each antenna group may be increased, or decreased, or maintained based on the TPC command for that antenna group. Different amounts of transmit power may be used for the G antenna groups. The same amount of transmit power may be used for all antennas in each group. The TPC commands may be used to set the transmit power of different antenna groups to different power levels.

The G antenna groups at the UE may have different channel gains, which may result in different received power for the G antenna groups at the eNB. The G antenna groups may also have different received signal qualities at the eNB. Performance may be degraded when there is imbalance in received signal quality or received power across the G antenna groups, especially with layer shifting and cubic metric preserved precoder. Furthermore, the G antenna groups at the UE may contribute differently to the interference observed by other eNBs.

TPC commands may be generated for the G antenna groups based on various metrics. In one design, TPC commands may be generated based on received signal quality. The eNB may determine the received signal quality for each antenna group at the eNB. The eNB may compare the received signal quality for each antenna group against one or more thresholds and may generate a TPC command for that antenna group based on the comparison result. In another design, TPC commands may be generated based on received power. The eNB may determine the received power for each antenna group at the eNB. The eNB may compare the received power for each antenna group against one or more thresholds and may generate a TPC command for that antenna group based on the comparison result. In yet another design, TPC commands may be generated based on IoT. The eNB may measure the amount of interference due to each antenna group at the eNB. The eNB may compute the IoT for each antenna group based on the measured interference for that antenna group. The eNB may compare the IoT for each antenna group against one or more IoT thresholds and may generate a TPC command for that antenna group based on the comparison result. The TPC commands may also be generated based on other metrics.

The second uplink power control design may provide better performance at the expense of greater overhead for the TPC commands. Multiple TPC commands may be used to adjust the transmit power for the G antenna groups at the UE to better control the received power or received signal quality at the eNB. The multiple TPC commands may also be used to minimize performance loss with layer shifting on the uplink. The multiple TPC commands may also enable better control of IoT at the eNB.

The TPC commands for the G antenna groups may be generated and sent in various manners for the second uplink power control design. In one design, a TPC command may be generated separately for each antenna group, e.g., based on any of the metrics described above. The TPC commands for all G antenna groups may be sent on the PDCCH to the UE, e.g., using DCI format 3 or 3A in LTE. For DCI format 3, a control message may include N TPC commands, with each TPC command comprising a 2-bit power adjustment. For DCI format 3A, a control message may include N TPC commands, with each TPC command comprising a 1-bit power adjustment. For both DCI formats 3 and 3A, a control message may include N TPC locations, and a TPC command may be sent in each TPC location. N may be configured by upper layer and conveyed to the UE. The UE may also be informed (e.g., via upper layer signaling) of the specific TPC locations assigned to the UE. The UE may receive a control message and may extract the TPC commands from the assigned TPC locations in the control message.

In another design, the TPC commands for the G antenna groups may be generated with differential encoding. A power adjustment $\Delta P(i)$ may be determined for each antenna group i, where i may be an index for antenna group and may range from 1 to G. The power adjustment for a designated antenna group may be used as a base TPC command. For example, antenna group 1 may be the designated antenna group, and the base TPC command may be set as TPC(i)=$\Delta P(i)$. A differential TPC command $\Delta TPC(i)$ may be generated for each remaining antenna group based on the power adjustment for that antenna group and the power adjustment for the designated antenna group. For example, the difference between the power adjustments for antenna group i and the designated antenna group may be computed as $\Delta P(i)-\Delta P(\mathbf{1})$ and may be quantized to obtain a differential TPC command for antenna group i, or TPC(i)=Quantize $\{\Delta P(i)-\Delta P(\mathbf{1})\}$. The base TPC command may be sent with more bits, e.g., two bits. Each differential TPC command may be sent with fewer bits, e.g., one bit. This design may provide good power control performance with less overhead.

In yet another design, the TPC commands for the G antenna groups may be generated with fewer bits to reduce overhead. DCI formats 0, 1, 1A, 1B, 1D, 2, 2A and 2B in LTE support transmission of a 2-bit TPC command for a UE whereas DCI format 3 supports transmission of one or more 2-bit TPC commands for a UE. A 1-bit TPC command may be generated for each antenna group. If there are only two antenna groups, then two 1-bit TPC commands for the two antenna groups may be sent using the two bits for a TPC command in DCI format 0, 1, 1A, 1B, 1D, 2, 2A or 2B. In this case, no additional overhead may be incurred for sending two 1-bit TPC commands to the UE. If there are more than two antenna groups, then G 1-bit TPC commands may be sent in G/2 TPC locations with DCI format 3, with two 1-bit TPC commands for two antenna groups being sent in each TPC location. Hence, overhead may be reduced by using fewer bits (e.g., one bit) for each TPC command.

In yet another design, the TPC commands for the G antenna groups may be sent using time division multiplexing (TDM) to reduce overhead. For example, G TPC commands for the G antenna groups may be sent in G time periods by cycling through the TPC commands. A TPC command for antenna group 1 may be sent in one time period, then a TPC command for antenna group 2 may be sent in the next time period, etc. This design may reduce overhead at the expense of greater latency.

The TPC commands for the G antenna groups may also be generated and sent in other manners. A combination of the designs described above may also be used. For example, differential encoding and TDM may be used together to reduce overhead as well as latency. A base TPC command for one antenna group may be sent in one time period, then multiple (e.g., two) differential TPC commands for multiple antenna groups may be sent in the next time period, etc.

The UE may be informed of the mapping of TPC commands to antenna groups (or the specific antenna group to which each TPC command applies) in various manners. In one design, the UE may be informed of the manner in which the TPC commands for the G antenna groups are sent. For example, the TPC commands may be sent using DCI format 3 or 3A, and the UE may be informed of a specific TPC location assigned to the UE for each antenna group. Multiple 1-bit TPC commands may be sent in a given TPC location, and the UE may be informed of which 1-bit TPC command is mapped to each bit at that TPC location. Multiple TPC commands may also be sent with TDM, and the UE may be informed of the specific time period in which the TPC command for each antenna group is sent. In any case, the UE can obtain the TPC command for each antenna group based on the known manner in which the TPC commands are sent by the eNB.

In another design, the TPC commands for the G antenna groups may be sent dynamically to the UE. For example, the eNB may send a TPC command for any antenna group in any control message sent to the UE or in any TPC location assigned to the UE. In one design, the G antenna groups may be assigned different scrambling codes. The TPC command for each antenna group may then be sent using the scrambling code for that antenna group. For example, a TPC command for a given antenna group may be sent in a control message using DCI format 0, 1, 1A, 1B, 1D, 2, 2A or 2B in LTE. In one design, all or a portion of this control message may be scrambled with the scrambling code for this antenna group. In another design, a cyclic redundancy check (CRC) may be generated for the control message. The CRC may be scrambled with the scrambling code and appended to the message. For both designs, the UE may descramble a received control message using different scrambling codes for different antenna groups. The UE may determine the specific antenna group for which a TPC command in the control message applies based on the scrambling code that results in correct descrambling (e.g., a passed CRC check).

In one design, the TPC commands for the G antenna groups may be sent in messages using existing DCI formats 0, 1, 1A, 1B, 1D, 2, 2A, 2B, 3 and/or 3A. In another design, the TPC commands may be sent in messages using new DCI formats. For example, a new DCI format capable of sending G TPC commands and other pertinent parameters may be defined.

Figure 3:
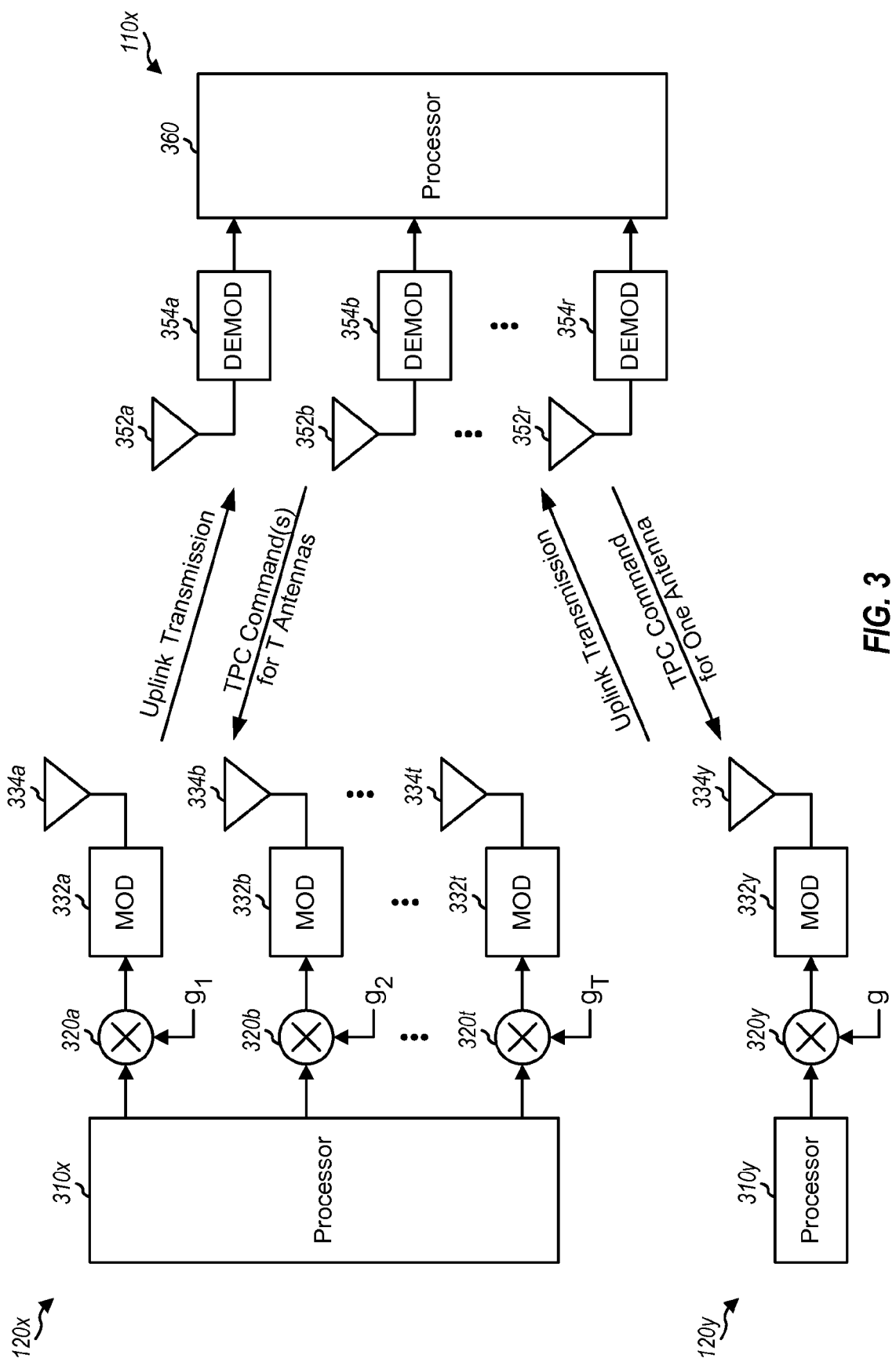
FIG. 3 shows a design of power control on the uplink for multiple antennas.

FIG. 3 shows a design of uplink power control for multiple antennas. A multi-antenna UE 120x may be equipped with multiple (T) antennas 334a through 334t that may be used for transmission on the uplink. A single-antenna UE 120y may be equipped with a single antenna 334y that may be used for transmission on the uplink.

Multi-antenna UE 120x may receive one or more TPC commands from an eNB 110x, e.g., one TPC command for each antenna group or for all T antennas. The TPC command(s) may be generated and sent based on any of the designs described above. UE 120x may determine a gain $g_t$ for each antenna t based on the TPC command applicable for antenna t, where t=1, . . . , T. The gain $g_t$ may determine the amount of transmit power used for antenna t. For the first uplink power control design, the gains for all T antennas may be determined based on a single TPC command that is applicable for all antennas. For the second uplink power control design, the gain for each antenna may be determined based on the TPC command for the antenna group to which that antenna belongs. In any case, UE 120x may obtain T gains $g_1$ through $g_T$ for the T antennas 334a through 334t, respectively.

Within UE 120x, a processor 310x may process data and/or control information to generate modulation symbols. Processor 310x may further process (e.g., precode or demultiplex) the modulation symbols to obtain output symbols for the T antennas. Multipliers 320a through 320t may receive the symbols for antennas 334a through 334t, respectively. Each multiplier 320 may multiply its symbols with a gain for the associated antenna and may provide output symbols to an associated modulator (MOD) 332. T modulators 332a through 332t may process their output symbols and generate T uplink signals, which may be transmitted via T antennas 334a through 334t, respectively.

Single-antenna UE 120y may receive a TPC command for its antenna 334y from eNB 110x and may determine a gain g for the antenna based on the TPC command. Within UE 120y, a processor 310y may process data and/or control information to generate modulation symbols. A multiplier 320y may multiply the modulation symbols with the gain g and may provide output symbols to a modulator 332y. Modulator 332y may process the output symbols and generate an uplink signal, which may be transmitted via antenna 334y.

At eNB 110x, R antennas 352a through 352r may receive the uplink signals from UEs 120x and 120y and may provide received signals to R demodulators (DEMOD) 354a through 354r, respectively. Each demodulator 354 may process its received signal to obtain received symbols. A processor 360 may obtain received symbols from all R demodulators 354a through 354r. Processor 360 may process the received symbols to determine a metric for each antenna group or for all T antennas at UE 120x. The metric may relate to received signal quality, received power, IoT, etc. Processor 360 may generate a TPC command for each antenna group or for all T antennas at UE 120x based on the metric for that antenna group or for all T antennas. Processor 360 may also process the received symbols to determine the metric for the antenna for UE 120y and may generate a TPC command for UE 120y based on the metric. Processor 360 may generate one or more control messages comprising the TPC commands for UEs 120x and 120y and may send the control message(s) to the UEs. Processor 360 may also process the received symbols to decode the data and/or control information sent by each UE.

As shown in FIG. 3, eNB 110x may perform uplink power control for both multi-antenna UE 120x and single-antenna UE 120y. eNB 110x may generate TPC commands in different manners for multi-antenna UE 120x and single-antenna UE 120y. eNB 110x may also generate one or more TPC commands for the T antennas at UE 120x based on different uplink power control designs.

FIG. 4 shows a design of a process 400 for performing uplink power control. Process 400 may be performed by a UE (as described below) or by some other entity. The UE may receive at least one TPC command for a plurality of antennas at the UE (block 412). The UE may adjust the transmit power for each of the plurality of antennas based on the at least one TPC command (block 414). The UE may send an uplink transmission from the plurality of antennas at the transmit power determined for each of the plurality of antennas (block 416). In one design, the plurality of antennas may be physical antennas at the UE. In another design, the plurality of antennas may be virtual antennas formed based on the physical antennas at the UE. Each virtual antenna may be formed with a set of precoding weights applied to the physical antennas.

In one design of block 412, the UE may receive a single TPC command for all antennas. The UE may adjust the transmit power for each of the plurality of antennas based on the single TPC command in block 414. The plurality of antennas may have equal or similar transmit power.

In another design of block 412, the UE may receive a plurality of TPC commands for a plurality of antenna groups, one TPC command for each antenna group. Each antenna group may comprise a different subset of the plurality of antennas. The UE may adjust the transmit power for each antenna group based on the TPC command for that antenna group. All antennas in each antenna group may have equal or similar transmit power. In one design, each antenna group may include a single antenna, and the plurality of antennas may have individually adjusted transmit power. In another design, an antenna group may include more than one antenna.

In general, the UE may receive the plurality of TPC commands at one or more TPC locations in one or more control messages. In one design, the UE may receive each TPC command in a separate control message. In another design, the UE may receive the plurality of TPC commands in a plurality of TPC locations in a single control message, one TPC command in each TPC location. In yet another design, the UE may receive the plurality of TPC commands in at least one TPC location in a control message. Each TPC command may comprise a single bit power adjustment. The UE may receive at least two TPC commands in each TPC location. In one design, the UE may receive the plurality of TPC commands sent in a plurality of time periods with time division multiplexing. The UE may also receive the plurality of TPC commands in other manners.

In one design, the plurality of TPC commands may be generated without differential encoding. The UE may adjust the transmit power for each antenna group based on the TPC command for that antenna group. In another design, the plurality of TPC commands may be generated with differential encoding and may include a base TPC command for a designated antenna group and at least one differential TPC command for at least one remaining antenna group. The UE may adjust the transmit power for the designated antenna group with the base TPC command. The UE may determine a power adjustment for each remaining antenna group based on the differential TPC command for that antenna group and the base TPC command. The UE may then adjust the transmit power for each remaining antenna group based on the power adjustment for that antenna group.

In one design, the TPC commands may be sent with group-specific scrambling. The UE may perform descrambling for each received TPC command based on a plurality of scrambling codes assigned to the plurality of antenna groups. The UE may determine an antenna group to which each TPC command applies based on the descrambling result. In one design, the UE may perform descrambling on all or part of a control message carrying a TPC command. In another design, the UE may perform descrambling on a CRC appended to the control message. The UE may also perform descrambling in other manners.

FIG. 5 shows a design of an apparatus 500 for performing uplink power control. Apparatus 500 includes a module 512 to receive at least one TPC command for a plurality of antennas at a UE, a module 514 to adjust the transmit power for each of the plurality of antennas at the UE based on the at least one TPC command, and a module 516 to send an uplink transmission from the plurality of antennas at the transmit power determined for each of the plurality of antennas.

Figure 6:
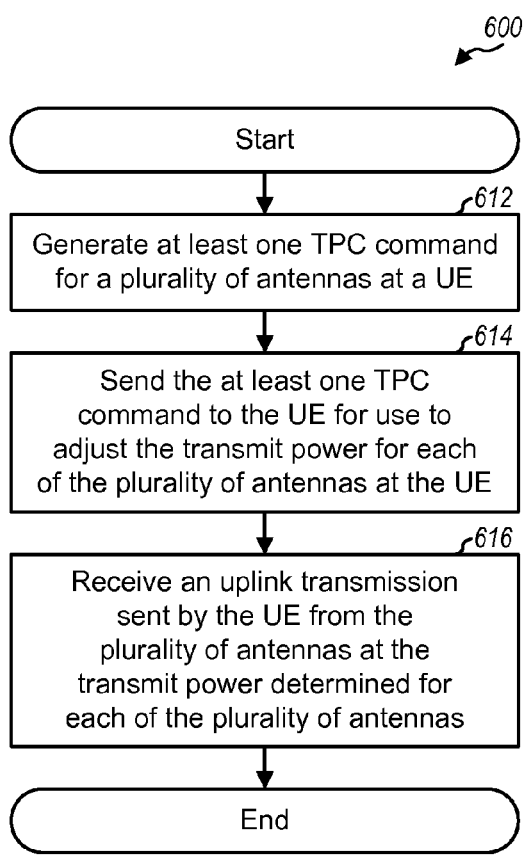
FIG. 6 shows a process for supporting uplink power control by a base station.

FIG. 6 shows a design of a process 600 for supporting uplink power control. Process 600 may be performed by a base station/eNB (as described below) or by some other entity. The base station may generate at least one TPC command for a plurality of antennas at a UE (block 612). The base station may send the at least one TPC command to the UE for use to adjust the transmit power for each of the plurality of antennas at the UE (block 614). The base station may thereafter receive an uplink transmission sent by the UE from the plurality of antennas at the transmit power determined for each of the plurality of antennas (block 616).

In one design of block 612, the base station may generate a single TPC command for all antennas at the UE. In another design of block 612, the base station may generate a plurality of TPC commands for a plurality of antenna groups at the UE, one TPC command for each antenna group. Each antenna group may include a different subset of the plurality of antennas. In one design, each antenna group may include a single antenna. In another design, an antenna group may include more than one antenna.

The base station may generate the TPC commands in various manners. In one design, the base station may determine a received signal quality for each antenna group and may generate a TPC command for each antenna group based on the received signal quality for that antenna group. In another design, the base station may determine a received power for each antenna group and may generate a TPC command for each antenna group based on the received power for that antenna group. In yet another design, the base station may determine interference due to each antenna group and may generate a TPC command for each antenna group based on the interference due to that antenna group. For example, the base station may determine an IoT for each antenna group based on the interference and may generate the TPC command based on the IoT. In general, the base station may generate the TPC command for each antenna group based on any suitable metric.

In general, the base station may send the plurality of TPC commands at one or more TPC locations in one or more control messages. In one design, the base station may send each TPC command in a separate control message. In another design, the base station may send the plurality of TPC commands in a plurality of TPC locations in a single control message, one TPC command in each TPC location. In yet another design, the base station may generate the plurality of TPC commands with each TPC command comprising a single bit power adjustment. The base station may send the plurality of TPC commands in at least one TPC location in a control message, with at least two TPC commands being sent in each TPC location. In one design, the base station may send the plurality of TPC commands in a plurality of time periods with time division multiplexing.

In one design, the base station may generate the plurality of TPC commands without differential encoding. The transmit power for each antenna group may be adjusted based on the TPC command for that antenna group. In another design, the base station may generate the plurality of TPC commands with differential encoding. The base station may generate (i) a base TPC command for a designated antenna group and (ii) at least one differential TPC command for at least one remaining antenna group.

In one design, the TPC commands may be sent with group-specific scrambling. The base station may determine a plurality of scrambling codes assigned to the plurality of antenna groups. The base station may perform scrambling for each TPC command based on a scrambling code for an antenna group to which the TPC command applies.

Figure 7:
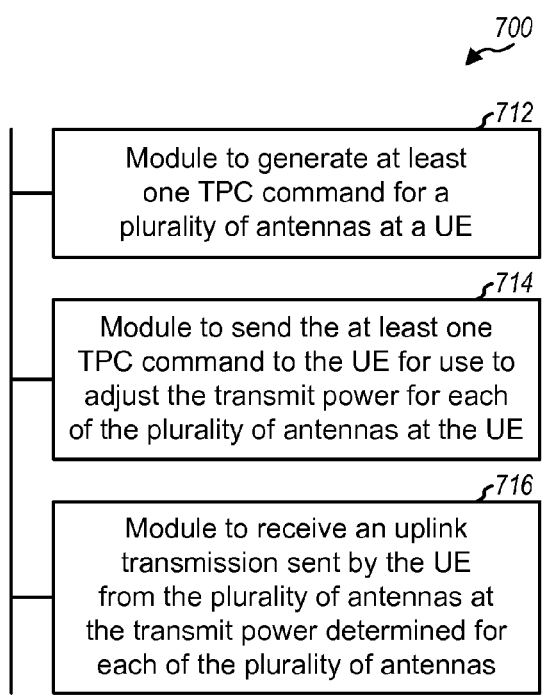
FIG. 7 shows an apparatus for supporting uplink power control.

FIG. 7 shows a design of an apparatus 700 for supporting uplink power control. Apparatus 700 includes a module 712 to generate at least one TPC command for a plurality of antennas at a UE, a module 714 to send the at least one TPC command to the UE for use to adjust the transmit power for each of the plurality of antennas at the UE, and a module 716 to receive an uplink transmission sent by the UE from the plurality of antennas at the transmit power determined for each of the plurality of antennas.

The modules in FIGS. 5 and 7 may comprise processors, electronic devices, hardware devices, electronic components, logical circuits, memories, software codes, firmware codes, etc., or any combination thereof.

Figure 8:
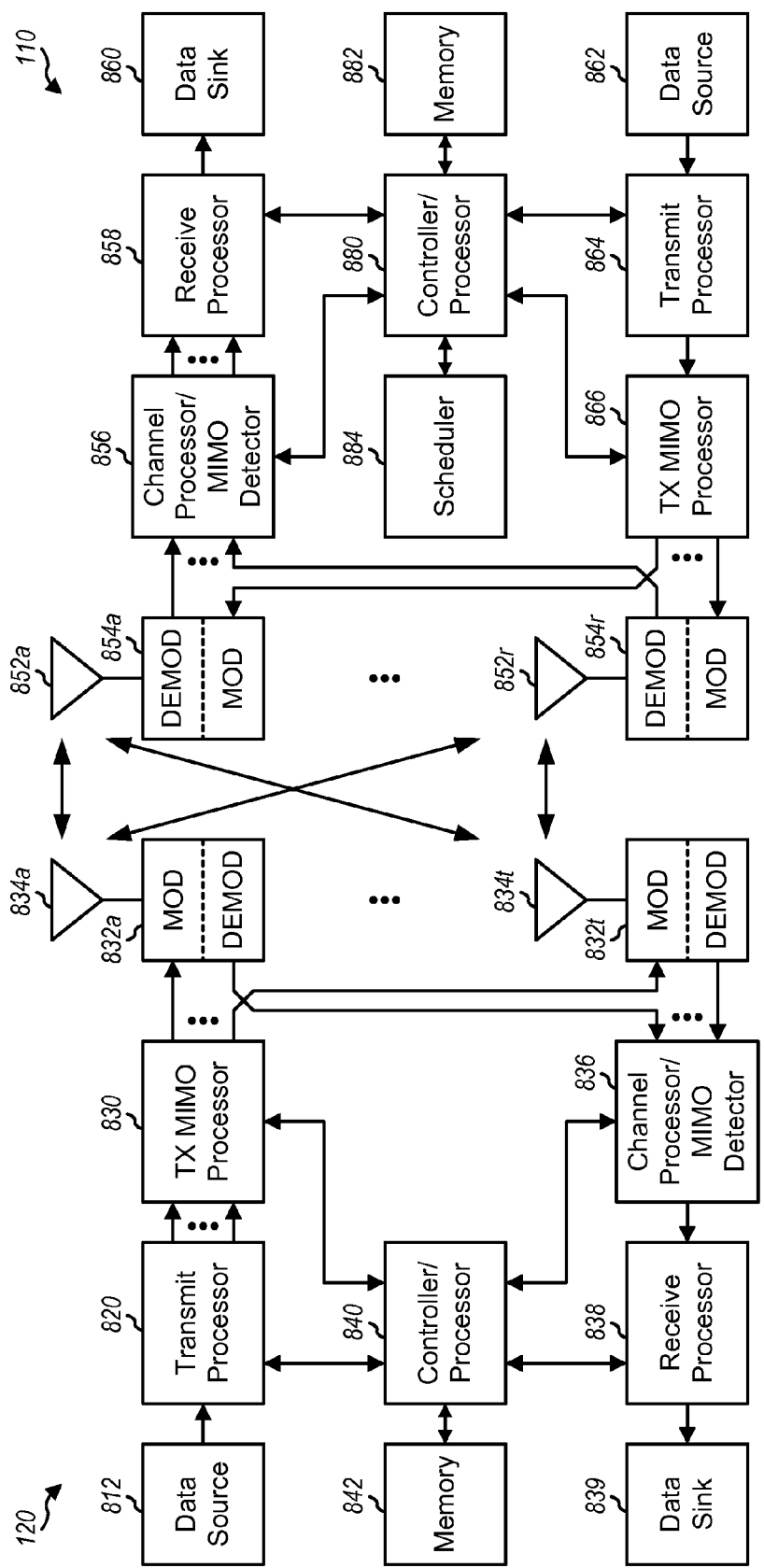
FIG. 8 shows a block diagram of a base station and a UE.

FIG. 8 shows a block diagram of a design of a base station/eNB 110 and a UE 120, which may be one of the eNBs and one of the UEs in FIG. 1. UE 120 may be equipped with multiple (T) antennas 834a through 834t, and base station 110 may be equipped with multiple (R) antennas 852a through 852r.

At UE 120, a transmit processor 820 may receive data from a data source 812 and control information from a controller/processor 840. Transmit processor 820 may process (e.g., encode, interleave, and symbol map) the data and control information to obtain data symbols and control symbols, respectively. Transmit processor 820 may also generate reference symbols for one or more reference signals. A transmit (TX) multiple-input multiple-output (MIMO) processor 830 may perform spatial processing (e.g., precoding) on the data symbols, the control symbols, and/or the reference symbols, if applicable, and may provide T output symbol streams to T modulators 832a through 832t. Each modulator 832 may process a respective output symbol stream (e.g., for SC-FDMA, OFDM, etc.) to obtain an output sample stream. Each modulator 832 may further process (e.g., convert to analog, amplify, filter, and upconvert) the output sample stream to obtain an uplink signal. T uplink signals from modulators 832a through 832t may be transmitted via T antennas 834a through 834t, respectively.

At base station 110, antennas 852a through 852r may receive the uplink signals from UE 120 and other UEs and may provide received signals to demodulators (DEMODs) 854a through 854r, respectively. Each demodulator 854 may condition (e.g., filter, amplify, downconvert, and digitize) a respective received signal to obtain received samples. Each demodulator 854 may further process the received samples to obtain received symbols. A MIMO detector 856 may obtain received symbols from all R demodulators 854a through 854r, perform MIMO detection/demodulation on the received symbols (if applicable), and provide detected symbols. A receive processor 858 may process (e.g., symbol demap, deinterleave, and decode) the detected symbols, provide decoded data to a data sink 860, and provide decoded control information to a controller/processor 880.

On the downlink, at base station 110, data from a data source 862 and control information (e.g., control messages carrying TPC commands) from controller/processor 880 may be processed by a transmit processor 864, precoded by a TX MIMO processor 866 if applicable, conditioned by modulators 854a through 854r, and transmitted to UE 120. At UE 120, the downlink signals from base station 110 may be received by antennas 834, conditioned by demodulators 832, processed by a MIMO detector 836, and further processed by a receive processor 838 to obtain the data and control information sent to UE 120. Processor 838 may provide the decoded data to a data sink 839 and the decoded control information to controller/processor 840.

Controllers/processors 840 and 880 may direct the operation at UE 120 and base station 110, respectively. Processor 840 and/or other processors and modules at UE 120 may perform or direct process 400 in FIG. 4 and/or other processes for the techniques described herein. Processor 820 and/or 830 may perform scaling to obtain the desired transmit power for each antenna at UE 120. Processor 880 and/or other processors and modules at base station 110 may perform or direct process 600 in FIG. 6 and/or other processes for the techniques described herein. Memories 842 and 882 may store data and program codes for UE 120 and base station 110, respectively. A scheduler 884 may schedule UEs for downlink and/or uplink transmission and may allocate resources to the scheduled UEs.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
receiving at least one transmit power control (TPC) command for a plurality of antennas at a user equipment (UE); and
adjusting transmit power for each of the plurality of antennas at the UE based on the at least one TPC command,
wherein the receiving at least one TPC command comprises receiving a plurality of TPC commands for a plurality of antenna groups at the UE, one TPC command for each antenna group, each antenna group comprising a different subset of the plurality of antennas.

2. The method of claim 1, wherein the receiving at least one TPC command comprises receiving a single TPC command for the plurality of antennas, wherein the adjusting the transmit power comprises adjusting the transmit power for each of the plurality of antennas based on the single TPC command, and wherein the plurality of antennas have equal transmit power.

3. The method of claim 1, wherein the adjusting the transmit power comprises adjusting the transmit power for each antenna group based on the TPC command for the antenna group, and wherein all antennas in each antenna group have equal transmit power.

4. The method of claim 1, wherein each of the plurality of antenna groups includes a single antenna in the plurality of antennas, and wherein the plurality of antennas have individually adjusted transmit power.

5. The method of claim 1, wherein at least one antenna group among the plurality of groups includes multiple antennas.

6. The method of claim 1, wherein the plurality of TPC commands are generated with differential encoding and comprise a base TPC command for one antenna group and at least one differential TPC command for at least one remaining antenna group in the plurality of antenna groups.

7. The method of claim 1, wherein the receiving the plurality of TPC commands comprises receiving the plurality of TPC commands in at least one TPC location in a control message, each TPC command comprising a single bit power adjustment, and at least two TPC commands being received in each TPC location.

8. The method of claim 1, wherein the receiving the plurality of TPC commands comprises receiving the plurality of TPC commands sent in a plurality of time periods with time division multiplexing.

9. The method of claim 1, further comprising:
performing descrambling for each received TPC command based on a plurality of scrambling codes assigned to the plurality of antenna groups to determine an antenna group to which the received TPC command applies.

10. The method of claim 1, further comprising:
sending an uplink transmission from the plurality of antennas at the transmit power determined for each of the plurality of antennas.

11. An apparatus for wireless communication, comprising:
means for receiving at least one transmit power control (TPC) command for a plurality of antennas at a user equipment (UE); and
means for adjusting transmit power for each of the plurality of antennas at the UE based on the at least one TPC command,
wherein the means for receiving at least one TPC command comprises means for receiving a plurality of TPC commands for a plurality of antenna groups at the UE, one TPC command for each antenna group, each antenna group comprising a different subset of the plurality of antennas.

12. The apparatus of claim 11, wherein the means for receiving at least one TPC command comprises means for receiving a single TPC command for the plurality of antennas, wherein the means for adjusting the transmit power comprises means for adjusting the transmit power for each of the plurality of antennas based on the single TPC command, and wherein the plurality of antennas have equal transmit power.

13. The apparatus of claim 11, wherein the plurality of TPC commands are generated with differential encoding and comprise a base TPC command for one antenna group and at least one differential TPC command for at least one remaining antenna group in the plurality of antenna groups.

14. The apparatus of claim 11, wherein the means for receiving the plurality of TPC commands comprises means for receiving the plurality of TPC commands in at least one TPC location in a control message, each TPC command comprising a single bit power adjustment, and at least two TPC commands being received in each TPC location.

15. The apparatus of claim 11, further comprising:
means for performing descrambling for each received TPC command based on a plurality of scrambling codes assigned to the plurality of antenna groups to determine an antenna group to which the received TPC command applies.

16. An apparatus for wireless communication, comprising:
a plurality of antennas;
a receive module configured to receive at least one transmit power control (TPC) command for the plurality of antennas at a user equipment (UE); and
a transmit module configured to adjust transmit power for each of the plurality of antennas at the UE based on the at least one TPC command,.
wherein the receive module is configured to receive a plurality of TPC commands for a plurality of antenna groups at the UE, one TPC command for each antenna group, each antenna group comprising a different subset of the plurality of antennas.

17. The apparatus of claim 16, wherein the receive module is configured to receive a single TPC command for the plurality of antennas, and wherein the transmit module is configured to adjust the transmit power for each of the plurality of antennas based on the single TPC command, the plurality of antennas having equal transmit power.

18. The apparatus of claim 16, wherein the plurality of TPC commands are generated with differential encoding and comprise a base TPC command for one antenna group and at least one differential TPC command for at least one remaining antenna group in the plurality of antenna groups.

19. The apparatus of claim 16, wherein the receive module is configured to receive the plurality of TPC commands in at least one TPC location in a control message, and to obtain at least two TPC commands from each TPC location, with each TPC command comprising a single bit power adjustment.

20. The apparatus of claim 16, wherein the receive module comprises a descrambler configured to perform descrambling for each received TPC command based on a plurality of scrambling codes assigned to the plurality of antenna groups to determine an antenna group to which the received TPC command applies.

21. A computer program product, comprising:
a non-transitory computer-readable medium comprising:
code for causing at least one computer to receive a plurality of transmit power control (TPC) commands for a plurality of antennas groups at a user equipment (UE), one TPC command for each antenna group, each antenna group comprising a different subset of the plurality of antennas, and
code for causing the at least one computer to adjust transmit power for each of the plurality of antennas at the UE based on the at least one TPC command.

22. A method for wireless communication, comprising:
generating at least one transmit power control (TPC) command for a plurality of antennas at a user equipment (UE); and
sending the at least one TPC command to the UE for use to adjust transmit power for each of the plurality of antennas at the UE,
wherein the generating at least one TPC command comprises generating a plurality of TPC commands for a plurality of antenna groups at the UE, one TPC command for each antenna group, each antenna group comprising a different subset of the plurality of antennas.

23. The method of claim 22, wherein the generating at least one TPC command comprises generating a single TPC command for all of the plurality of antennas at the UE.

24. The method of claim 22, wherein each of the plurality of antenna groups includes a single antenna in the plurality of antennas at the UE.

25. The method of claim 22, wherein the generating the plurality of TPC commands comprises:
determining a received signal quality for each of the plurality of antenna groups, and
generating a TPC command for each antenna group based on the received signal quality for the antenna group.

26. The method of claim 22, wherein the generating the plurality of TPC commands comprises:
determining a received power for each of the plurality of antenna groups, and
generating a TPC command for each antenna group based on the received power for the antenna group.

27. The method of claim 22, wherein the generating the plurality of TPC commands comprises:
determining interference due to each of the plurality of antenna groups, and
generating a TPC command for each antenna group based on the interference due to the antenna group.

28. The method of claim 22, wherein the generating the plurality of TPC commands comprises:
generating a base TPC command for one antenna group in the plurality of antenna groups, and
generating at least one differential TPC command for at least one remaining antenna group in the plurality of antenna groups.

29. The method of claim 22, wherein the generating the plurality of TPC commands comprises generating each TPC command comprising a single bit power adjustment, and
wherein the sending the at least one TPC command comprises sending the plurality of TPC commands in at least one TPC location in a control message, with at least two TPC commands being sent in each TPC location.

30. The method of claim 22, wherein the sending the at least one TPC command comprises sending the plurality of TPC commands in a plurality of time periods with time division multiplexing.

31. The method of claim 22, wherein the generating the plurality of TPC commands comprises:
determining a plurality of scrambling codes assigned to the plurality of antenna groups, and
performing scrambling for each TPC command based on a scrambling code for an antenna group to which the TPC command applies.

32. The method of claim 22, further comprising:
receiving an uplink transmission sent by the UE from the plurality of antennas at the transmit power determined for each of the plurality of antennas.

33. An apparatus for wireless communication, comprising:
means for generating at least one transmit power control (TPC) command for a plurality of antennas at a user equipment (UE); and
means for sending the at least one TPC command to the UE for use to adjust transmit power for each of the plurality of antennas at the UE,
wherein the means for generating at least one TPC command comprises means for generating a plurality of TPC commands for a plurality of antenna groups at the UE, one TPC command for each antenna group, each antenna group comprising a different subset of the plurality of antennas.

34. The apparatus of claim 33, wherein the means for generating at least one TPC command comprises means for generating a single TPC command for all of the plurality of antennas at the UE.

35. The apparatus of claim 33, wherein the means for generating the plurality of TPC commands comprises:
means for generating a base TPC command for one antenna group in the plurality of antenna groups, and
means for generating at least one differential TPC command for at least one remaining antenna group in the plurality of antenna groups.

36. The apparatus of claim 33, wherein the means for generating the plurality of TPC commands comprises means for generating each TPC command comprising a single bit power adjustment, and wherein the means for sending the at least one TPC command comprises means for sending the plurality of TPC commands in at least one TPC location in a control message, with at least two TPC commands being sent in each TPC location.

37. The apparatus of claim 33, wherein the means for generating the plurality of TPC commands comprises:
means for determining a plurality of scrambling codes assigned to the plurality of antenna groups, and
means for performing scrambling for each TPC command based on a scrambling code for an antenna group to which the TPC command applies.

\* \* \* \* \*